United States Patent [19]
Pettit

[11] Patent Number: 5,513,259
[45] Date of Patent: Apr. 30, 1996

[54] RESEALABLE MODULE FOR SUPPORTING ACOUSTIC TRANDUCER AND PRINTED CIRCUIT COMPONENTS WITHIN RECEIVER END OF CRAFTSPERSON'S TEST SET

[75] Inventor: Greg J. Pettit, Camarillo, Calif.

[73] Assignee: Harris Corporation, Melbourne, Fla.

[21] Appl. No.: 271,295

[22] Filed: Jul. 6, 1994

[51] Int. Cl.[6] .................................................. H04M 1/00
[52] U.S. Cl. ........................ 379/429; 379/428; 379/433; 379/434
[58] Field of Search .................................... 379/428, 433, 379/434, 629

[56] References Cited

U.S. PATENT DOCUMENTS 4,163,875  8/1979  Cogan ........................................ 379/433
5,369,701  11/1994 McAteer et al. ........................... 379/428

OTHER PUBLICATIONS

Harris, Introducing the Only Test Set with a Built-in Amplified Speaker, May 11, 1987.

*Primary Examiner*—Jeffery Hofsass
*Assistant Examiner*—Jack Chiang
*Attorney, Agent, or Firm*—Charles E. Wands

[57] ABSTRACT

The unwanted introduction of contaminant material into the interior of a craftsperson's telephone test set is effectively prevented by modifying the housing configuration of the hand and face-conformal segment of the test set to incorporate a resealable module that is sized to accommodate printed circuit components that are to be protected from contaminants in a compact nested arrangement. The resealable module comprises a shell configured to be insertable within a receiver-retaining portion of the test set body. The shell has an acoustic opening which is adjacent to an acoustic energy coupling portion of the test set body, when the module is inserted into the receiver-retaining portion of the test set body. The acoustic opening is configured to seal a bottom portion of the shell with the test set body. A printed circuit motherboard has a plurality of printed circuit modules and is supported on the shell, so as to provide an acoustic chamber within the interior of the shell adjacent to the acoustic opening. A module enclosure top is seated tightly against and seals the top of the shell.

26 Claims, 7 Drawing Sheets

RESEALABLE MODULE FOR SUPPORTING ACOUSTIC TRANDUCER AND PRINTED CIRCUIT COMPONENTS WITHIN RECEIVER END OF CRAFTSPERSON'S TEST SET

FIELD OF THE INVENTION

The present invention relates in general to a telephone craftsperson's test set, and is particularly directed to a modification of the structural configuration of a test set to incorporate a resealable module in the receiver (earpiece) end of the test set, the resealable module being sized to accommodate printed circuit components in a nested arrangement while, at the same time, being internally shaped to augment the volume of the acoustic chamber in which the receiver is placed, so as to enhance the electrical-to-audio performance of the receiver transducer.

BACKGROUND OF THE INVENTION

Figure 1:
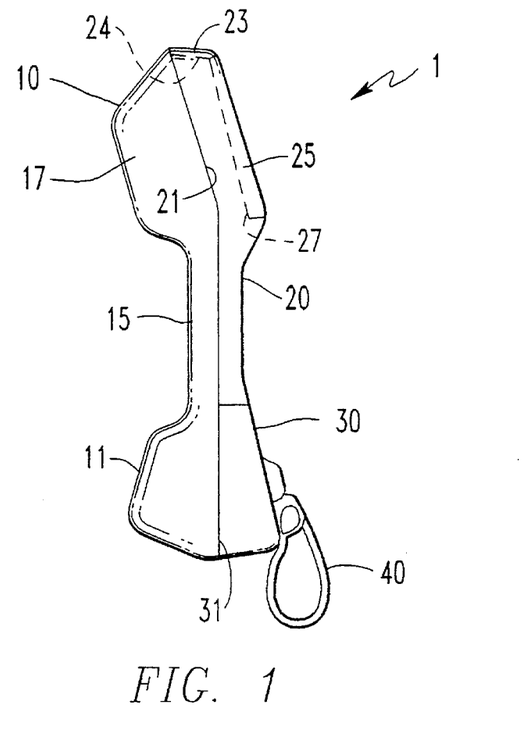
FIGS. 1 and 2 are respective diagrammatic side and front views of the body configuration of a telephone craftsperson's test set.
Figure 2:
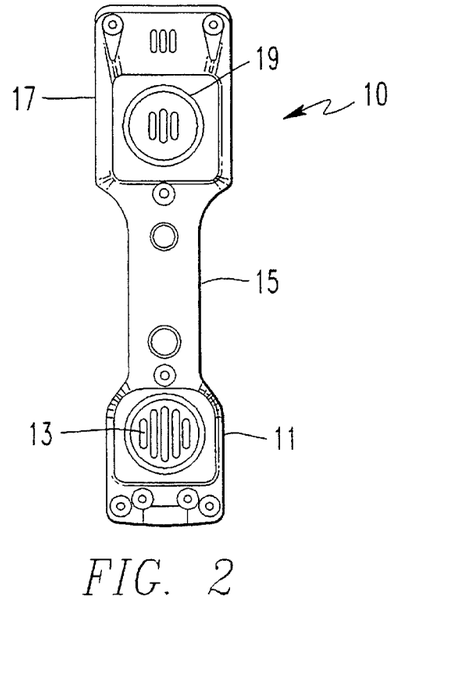

The housing or body configuration of a telephone line test set currently employed by telephone craftspersons is generally configured as diagrammatically illustrated at 1 in FIGS. 1 and 2 to include a first, generally hand and face-conformal case segment 10 containing earpiece and mouthpiece transducers, a second, keypad case segment 20, which houses a test set keypad and fits on a first back portion 21 of the case segment 10, and a third, clip case segment 30, which houses a belt clip 40 and fits on a second back portion 31 of the case segment 10, contiguous with the first back portion 21.

The first case segment 10 has a first flared body end 11, which is sized and shaped to accommodate an acousto-electrical transmitter unit (mouthpiece) 13. This first flared body portion 11 is connected by a second, central handle portion 15 which, in turn, adjoins a third flared body end 17, that is configured to accommodate a receiver-mounting structure, in which an electrical-to-acoustic receiver unit (earpiece) 19 is supported. Associated with the respective transmitter and receiver transducers are circuit components, typically mounted on printed circuit boards, that are arranged within the confines of the first case segment 10. The printed circuit boards are connected via a ribbon cable 23 at an upper end 24 of the keypad case segment 20 to a keypad unit 25, shown in dotted lines in FIG. 1 and in detail in FIGS. 3A, 3B and 3C (to be described).

Although the test set body is customarily formed of durable plastic material, the interior of the first case segment 10, where the printed circuit components reside, is usually vented to the atmosphere, so that contaminants (e.g. moisture and dust) are allowed to enter the case and are a source of potential degradation of the operation of the circuit components housed within the test set. Efforts to circumvent this contaminant-based degradation problem have included coating printed circuit assemblies with non-conductive passivating materials, coating the electrical contacts of individual components with non-conductive adhesives, and enclosing the printed circuit assemblies within a permanently sealed module. Unfortunately, these previous proposals have proven to be less than satisfactory.

More particularly, it has been found that coating the printed circuit assemblies is inadequate, since during the coating process, the coating material tends to pull away from the sharp points at the ends of the electrical contacts of circuit components, which leaves them exposed to contamination. Coating the electrical contacts has been not been found to provide consistently robust protection, due to inconsistencies in the coating application process, so that contaminants are not completely sealed out. Finally, placing the printed circuit assemblies inside a permanently sealed enclosure prevents repairs or retrofits without destroying the seal, which cannot be restored.

SUMMARY OF THE INVENTION

In accordance with the present invention, the above problems are effectively solved by means of a new and improved test set body architecture, in which the housing configuration of the first, hand and face-conformal segment of the test set is modified to incorporate a resealable module that is sized to accommodate printed circuit components that are to be protected from contaminants in a compact nested arrangement. This resealable module is inserted into the receiver (earpiece) end of the test set in place of the normally provided receiver-mounting support structure, and is shaped to both house the printed circuit components and also to provide a sufficient acoustic volume adjacent to the earpiece, so as to enhance the electrical-to-audio performance of the receiver transducer.

For this purpose the resealable module of the present invention includes a main body or shell portion, atop which a printed circuit motherboard is mounted, with a module enclosure top overlying the motherboard and being affixed to the shell portion upon which the motherboard is seated. The shell portion is shaped to be inserted within and nest adjacent to the interior periphery of the flared body end of the test set containing the receiver unit (earpiece).

The shell portion of the module has a generally rectangular or box shape and a height slightly less than that of the flared body end of the test set. A pair of lip portions extend from end walls of the shell, and are sized so as to accommodate as large as possible printed circuit motherboard to be mounted thereon. The shell further includes a set of bored posts at interior corner regions for receiving mounting screws that secure the module enclosure top and the printed circuit motherboard to the shell. A detent is provided in each endwall of the shell to allow for passage of ribbon cables from the printed circuit motherboard to the keypad unit and to circuit connections at the interior handle portion of the test set.

A bottom surface of the shell has a generally circular opening surrounded by an annular rim that protrudes outwardly beyond the bottom surface. This generally circular opening has a pair of diametrically opposed slots, which are sized to allow a generally disc-shaped receiver element to pass through the slots when the receiver element is oriented 'on edge' relative to the slots The annular rim has a depth which is sized to accommodate the thickness of the receiver element. In the course of assembly, leads of the receiver element are connected to the motherboard and then dropped through the slots. Once rotated parallel to the bottom surface of the shell, the receiver element is placed against the bottom surfaces of lip portions of the bottom surface adjacent to the slots that intersect the circular opening.

The annular rim portion of the bottom surface of the shell has an interior wall whose diameter is slightly greater than the diameter of the receiver element. Distributed around the surface of this interior wall are a plurality of bumps, that are sized to provide a snug frictional capture of receiver element within the annular rim. Because of the thickness of the bumps, thin annular gaps are formed between the bumps between the exterior sidewall of the receiver element and the interior wall of the annular rim. These gaps serve to equalize the pressure on opposite sides of the acoustic diaphragm of the receiver.

Also included as part of the receiver assembly is a generally ring-shaped receiver retainer seal, made of a flexible sealing material such as silicone rubber. This retainer seal is captured snugly around the annular rim, so that when the module is installed into the receiver end of the case, the bottom surface of the receiver retainer seal abuts against the bottom interior surface of the case, thereby providing a pressure seal between the module and the case.

With the printed circuit motherboard mounted to the top of the shell, printed circuit modules mounted thereon extend into the shell and are connected by way of printed circuit traces on the motherboard to the ribbon cables for connection to portions of the test set external to the module. The printed circuit modules are arranged on the printed circuit motherboard in a spaced apart, side-by-side relationship, such that there is an open portion of the interior of the shell adjacent to the receiver element. Such an arrangement provides one or more air gaps among the modules, so as to form an acoustic chamber adjacent to the receiver transducer, thereby augmenting its acoustic output.

Attached to the top portion of the printed circuit motherboard is a module enclosure top, the periphery of which is shaped to conform with the top peripheral edge of the shell, whereby the module enclosure top may be seated tightly against and seal the top of the shell. The module enclosure top may be securely attached to the shell by way of screws inserted through bores in the module top and screwed into hollow posts of the shell. In this manner, both the module enclosure top and the printed circuit motherboard may be fixedly captured in a compact stacked arrangement at the top portion of the shell.

Where installation of a toggle switch in the keypad unit employs a breakout connector on the back of the keypad, accommodation is made in the module enclosure top for the resulting protrusion at the rear of the keypad unit. Specifically, in the area of the toggle switch, the module enclosure top has a depression co-located with the location of the toggle switch on the keypad unit, so that when the keypad case segment of the test set engages the main case segment, the keypad unit will fit flush against the module. The module enclosure top also has an indent at an edge portion. The indent is sized to provide for a compact ribbon cable feed path between the printed circuit motherboard and the keypad unit.

DETAILED DESCRIPTION OF THE DRAWINGS

DETAILED DESCRIPTION

Figure 4:
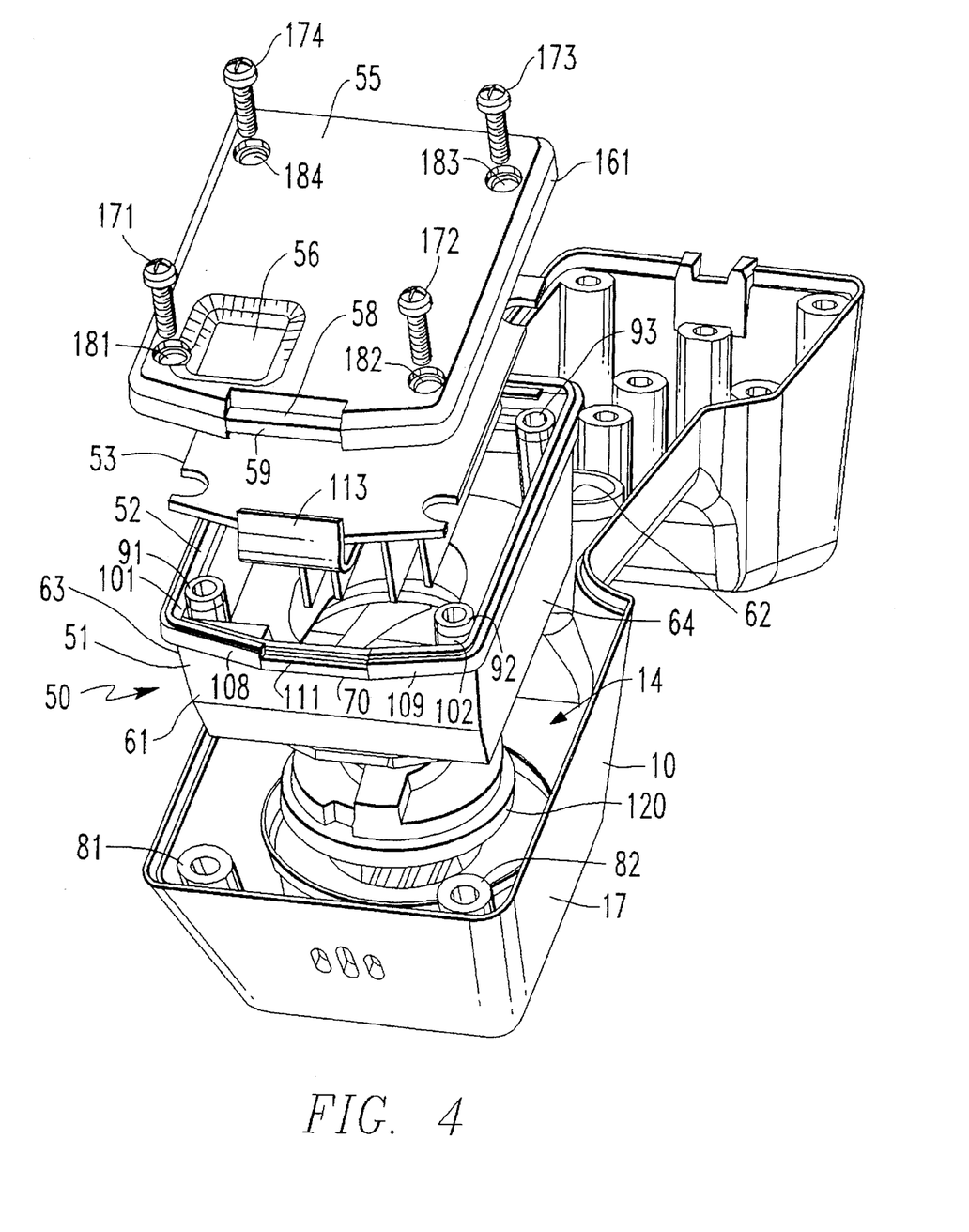
FIG. 4 diagrammatically illustrates an exploded view of a hand and face-conformal segment of the test set, together with the components of a resealable module of the present invention.

The test set body architecture of the present invention will now be described with reference to FIGS. 4–15, which diagrammatically illustrate both the details of the resealable module of the invention and the manner in which the housing configuration of a craftsperson's test set is modified to accept the module. For this purpose, FIG. 4 diagrammatically illustrates an exploded view of the first, hand and face-conformal segment 10 of the test set, and the components of a resealable module 50, further shown in detail in the exploded views of FIGS. 5 and 6, the resealable module 50 being inserted into the receiver (earpiece) end 17 of the test set. (In order to avoid cluttering the drawing, FIG. 4 does not show either the keypad case segment 20 or the clip case segment 30.) The components of the resealable module of the present invention include shell portion 51, a printed circuit motherboard 53 and a module enclosure top 55. With the normally employed receiver element-supporting support frame removed from the earpiece portion 17 of the case, the shell portion 51 is shaped to be insertable within and readily nest in adjacent to or in proximity to the interior periphery 14 of the receiver-containing end 17 of the body segment 10 of the test case.

Figure 5:
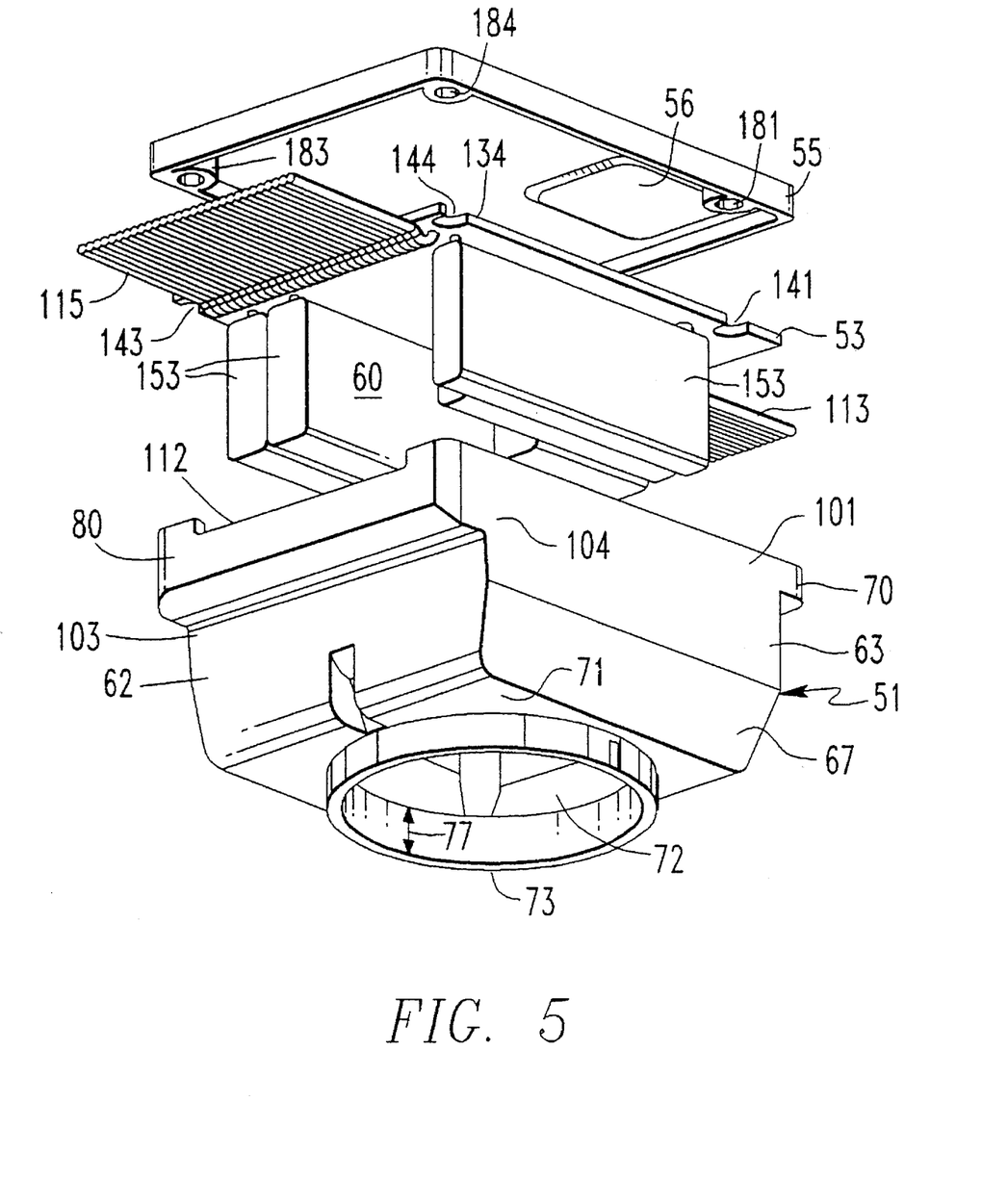
FIGS. 5 and 6 are exploded views, which diagrammatically illustrate the components of a resealable module of the present invention.
Figure 6:
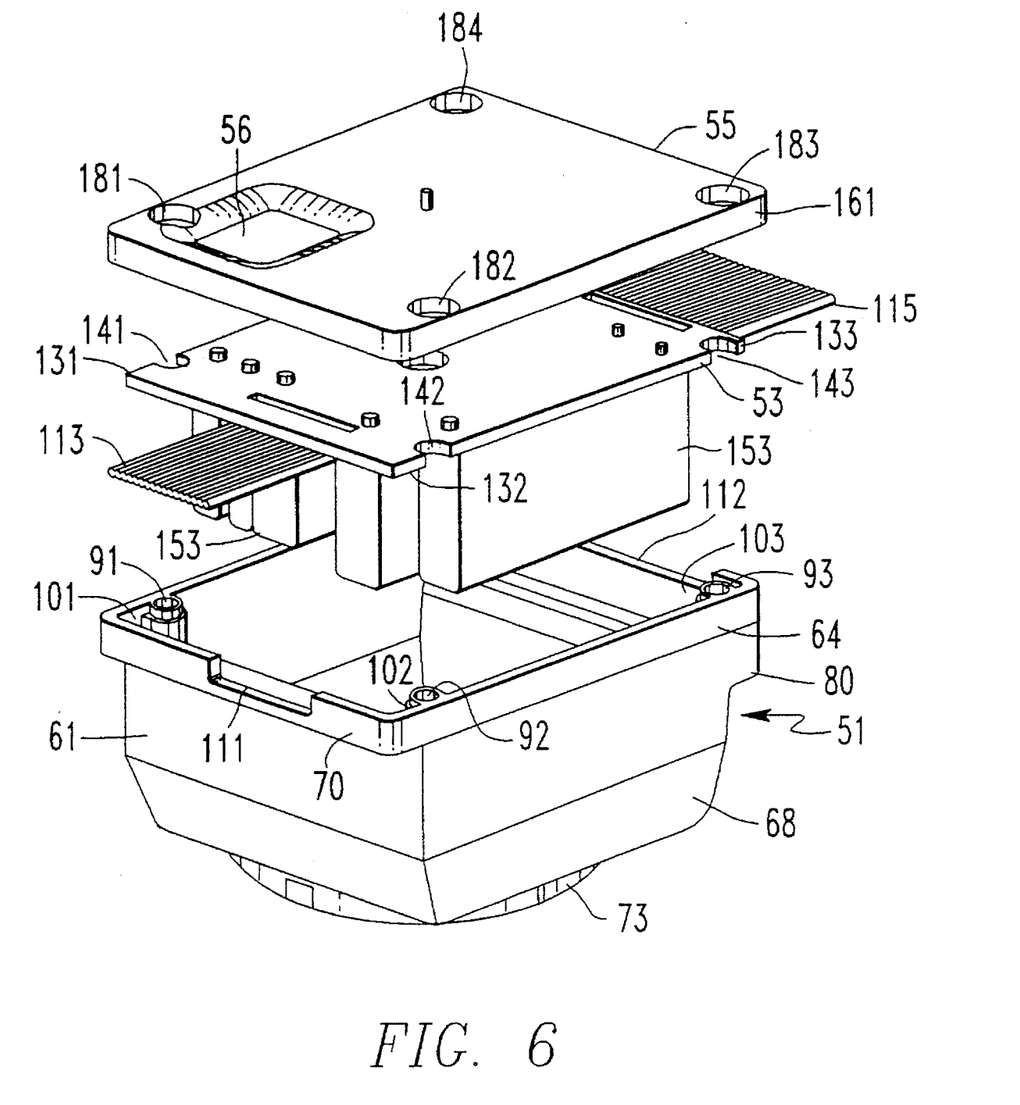
Figure 7:
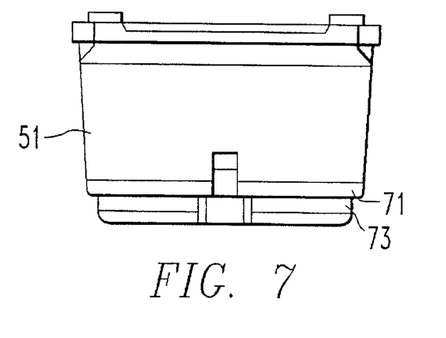
FIGS. 7, 8, 9 and 10 are respective end, side, top and enlarged bottom views of a shell portion of the resealable module of the present invention.
Figure 8:
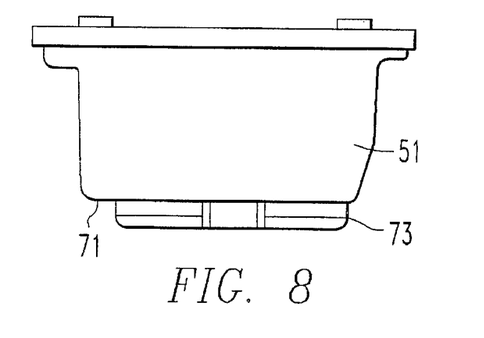

For this purpose, as diagrammatically illustrated in the exploded views of FIGS. 5 and 6, and in the respective end, side and top views of FIGS. 7, 8, 9 and 10, shell portion 51 has a generally rectangular shape defined by endwall portions 61 and 62, and sidewall portions 63 and 64, which intersect endwall portions 61 and 62. The height of shell portion 51 is slightly less than that of the flared body end 17 of case segment 10.

Figure 9:
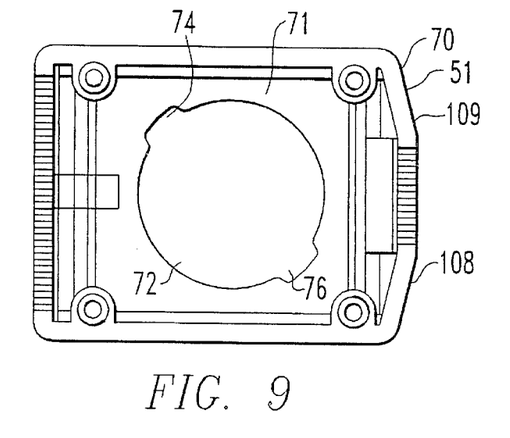
Figure 10:
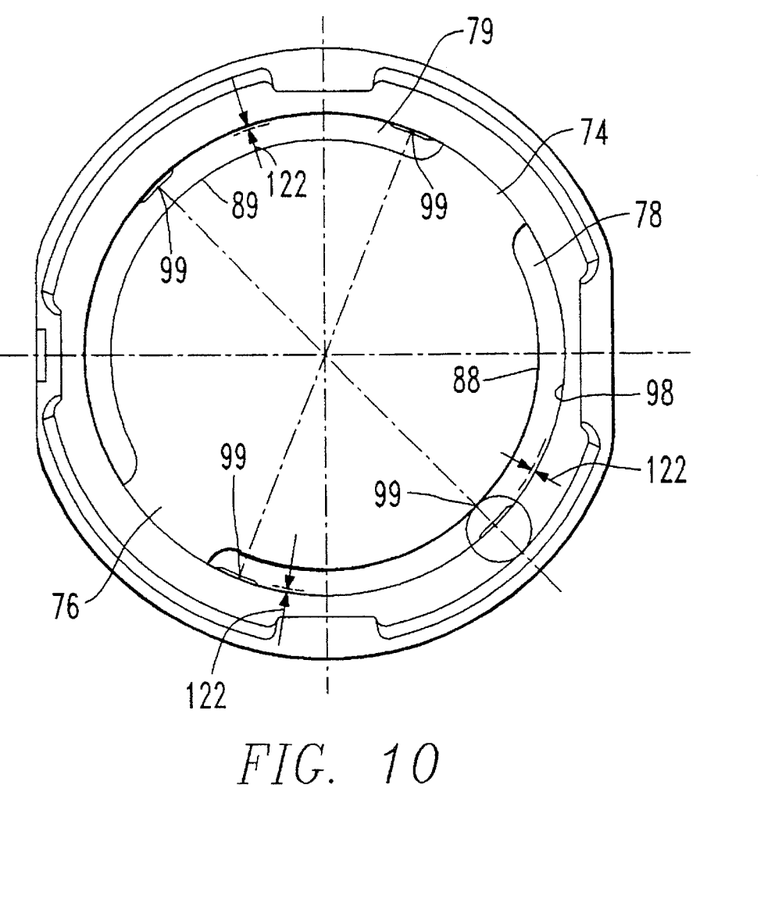

Sidewall portions 63 and 64 also include inwardly tapered surface portions 67 and 68, which facilitate placement of the shell within the interior surface of the receiver cavity 17 of the test set body segment 10. A pair of lip portions 70 and 80 extend from end wall portions 61 and 62, and are sized so as to accommodate as large as possible printed circuit motherboard to be mounted thereon. Although not shown as such in FIGS. 5 and 6, lip portion 70 is tapered back or chamferred at 108 and 109, as shown in FIGS. 4 and 9, so that shell 51 may fit within receiver cavity 17 adjacent to posts 81 and 82, which are molded into the receiver cavity of the test set body. Posts 81 and 82 are bored to receive attachment screws for the keypad case segment 20, referenced above.

Shell portion 51 further includes a set of four generally hollow or bored posts, three of which are shown at 91, 92 and 93, at interior corner regions 101–104, for receiving mounting screws that secure the module enclosure top 55 and the motherboard 53 to the shell portion 51, as will be described. A detent 111 is provided in endwall 61 to allow for passage of a first ribbon cable 113 from motherboard 53 to the keypad unit. Similarly, a second, somewhat wider, detent 112 is provided in endwall 62 to allow for passage of a second ribbon cable 115 from motherboard 53 to circuit connections at the interior handle portion of the test set. In order to seal the openings formed by detents 111 and 112 through which ribbon cables 113 and 115 pass, a coating of an enclosure sealant material, such as silicon gel, is applied to the detents and those portions of the ribbon cables passing through the detents.

The endwall and sidewalls of the shell portion 51 terminate at a generally flat bottom surface portion 71, which has a generally circular opening 72 surrounded by an annular rim portion 73, that protrudes outwardly slightly beyond bottom surface portion 71. As shown in FIG. 9 and in the enlarged view of FIG. 10, generally circular opening 72 has a pair of diametrically opposed slots 74 and 76, which are sized to allow for the passage therethrough of the receiver element, which is generally disc-shaped, as shown at 120 in FIG. 4, when the receiver element is oriented 'on edge', relative to the slots. Annular rim portion 73 has a depth 77 which is sized to accommodate the thickness of the receiver element 120. In the course of assembly, the receiver element 120 is first wire-connected to the motherboard and then dropped through slots 74 and 76. Once rotated ninety degrees the receiver element may be placed against the bottom surfaces 78, 79 of lip portions 88, 89 adjacent to the slots 74, 76 that intersect the circular opening 72.

Annular rim portion 73 of shell 51 has an interior wall 98 whose diameter is slightly greater than the diameter of receiver element 120. Distributed around the surface of the interior wall 98 of annular rim portion 73 of shell 51 are a plurality of raised regions or bumps 99, which are sized to provide a snug frictional capture of receiver element 120 within annular rim portion 72. By virtue of the thickness of bumps 99, a series of thin annular gaps 122 are formed adjacent to the bumps between the exterior sidewall of the receiver element 120 and the interior wall 98 of the annular rim portion of the shell 51. These gaps serve to equalize the pressure on opposite sides of the receiver diaphragm.

Figure 11:
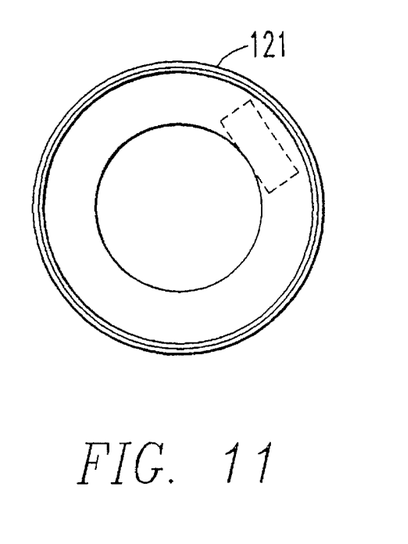
FIGS. 11 and 12 are respective plan and side views of a generally ring-shaped receiver retainer seal.
Figure 12:
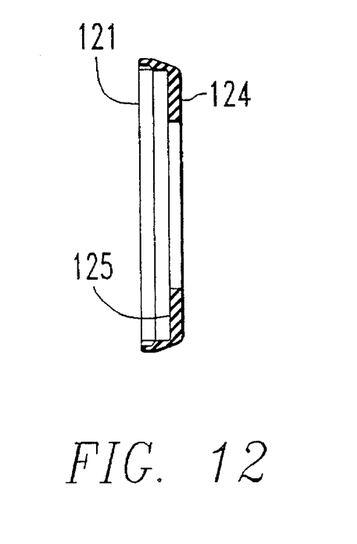

Also included as part of the receiver assembly is a generally ring-shaped receiver retainer seal 121, made of a flexible sealing material such as silicone rubber, and respective plan and side views of which are shown in FIGS. 11 and 12, is sized to fit snugly around and be captured by annular rim portion 73. As a consequence, when the module 50 is installed in the test set, the bottom surface 124 of the receiver retainer seal 121 that has been captured around annular rim portion of shell 51 abuts against the bottom interior surface 18 of case 10, thereby providing a pressure seal between module 50 and case segment 10. In this installed configuration, the bottom of the receiver element 120 rests against the opposite interior surface 125 of the retainer seal 121, while its top surface abuts against the bottom surfaces 78, 79 of lip portions 88, 89 adjacent to the slots 74, 76 that intersect the circular opening 72, thereby ensuring a complete seal of circular opening 72 at the bottom of shell 51.

Situated at shell portion 51 is a printed circuit motherboard 53, respective corners 131–134 of which have apertures 141–144 that are sized to fit upon posts 91–94 at the interior corner regions of shell 51, so that the motherboard 53 may be captured at the top portion of the shell. Mounted on surface 151 of board 53, which faces downwardly to the interior of shell are a plurality of printed circuit modules 153, which are connected by way of printed circuit traces on board 53 to respective ribbon cables 113 and 115 for connection to portions of the test set external to module 50. Printed circuit modules 153 are arranged on printed circuit board 53, so that there is an open portion of the interior of shell 51 adjacent to or above receiver element 120, so as to provide a volume for acoustic vibration adjacent to the earpiece, thereby enhancing the electrical-to-audio performance of the receiver transducer 120. As diagrammatically illustrated in the exploded views of FIGS. 5 and 6, this may be accomplished by arranging the printed circuit modules 153 in a spaced apart, side-by-side relationship, so as to provide one or more air gaps or 'canyons' 60 among the modules 153, which serve as an acoustic chamber adjacent to the receiver transducer 120, thereby augmenting its acoustic output.

Figure 13:
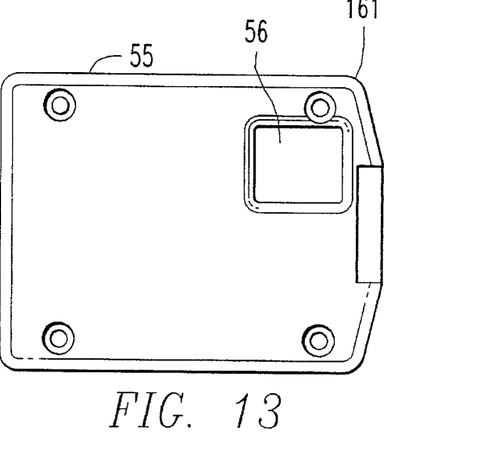
FIGS. 13, 14 and 15 are respective top, bottom and side views of a module enclosure top.
Figure 14:
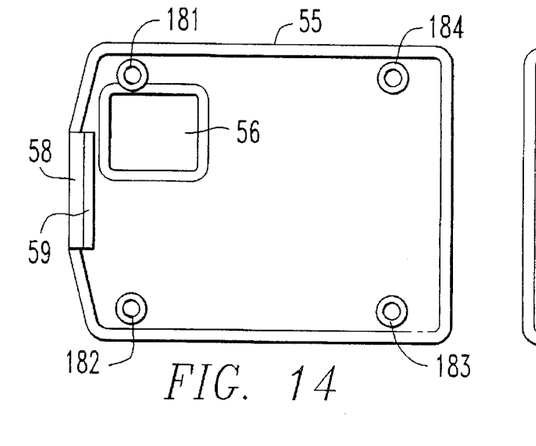
Figure 15:
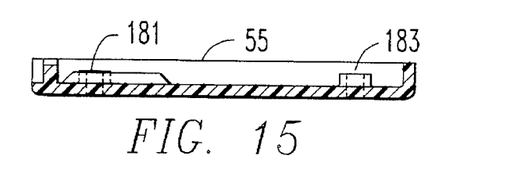

Finally, attached to the top or outer portion of printed circuit motherboard 53 is a module enclosure top 55, shown in detail in FIGS. 13, 14 and 15. The periphery 161 of module enclosure top is shaped to conform with that of the top peripheral edge 163 of shell 51, so that module enclosure top 55 may be seated tightly against and seal the top portion of shell 51. Module enclosure top is securely attached to shell 51 by placing on the top surface of shell 51 a gasket or sealing ring, shown at 52 in FIG. 4, such as a silicone rubber sealing ring, that is sized to be captured in and protrude slightly above a depression or groove along the peripheral underside of module enclosure top 55. Then a set of four screws 171–174, having conformal seals on the undersides of their heads, are inserted through bores 181–184 in module top 55 and screwed into hollow posts 91–94 at the interior corner regions 101–104 of shell 51, whereby both module top 55 and motherboard 53 may be fixedly captured at the top portion of the shell.

Before the motherboard 53 is placed into the shell 51 in the course of assembly, a pad of shock absorbing material, such as foam rubber, shown at 54 in FIG. 4, is placed at the bottom of the shell, so that to provide a physical interface between shell 51 and printed circuit modules 153. Foam rubber pad 54 serves as both a shock absorber, and also effectively frictionally secures the lower edge surfaces of the printed circuit modules 153, and thereby prevents the printed circuit modules from departing (bending away) from their intended vertical orientation relative to motherboard 53 in the presence of acceleration forces acting upon the test set.

Figure 3A:
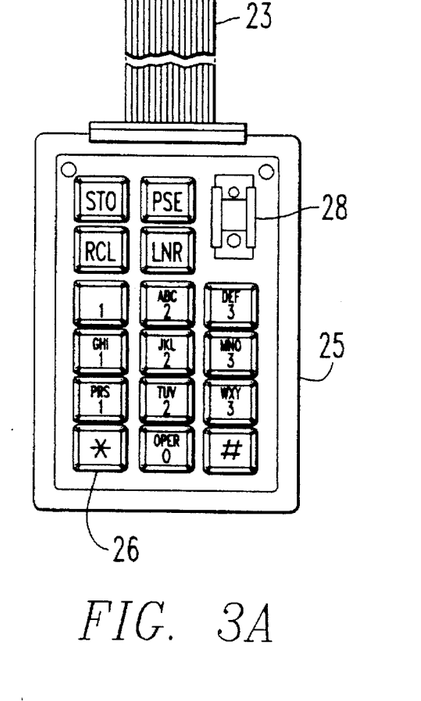
FIGS. 3A, 3B, and 3C show the components of a keypad unit.
Figure 3B:
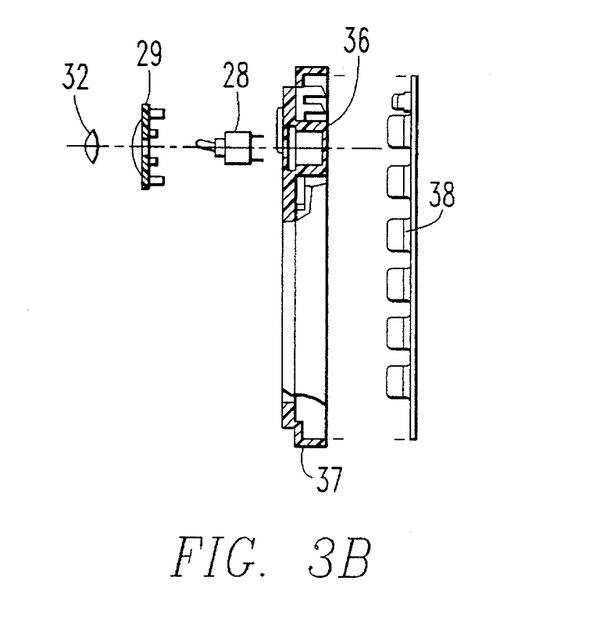
Figure 3C:
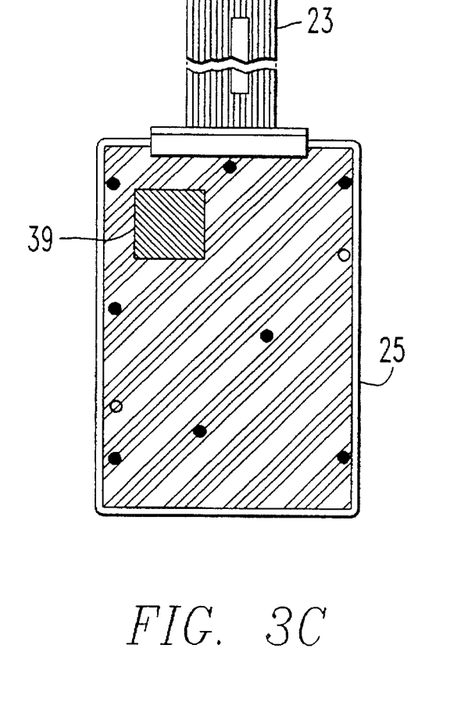

As shown in FIGS. 3A, 3B and 3C, in addition to an array of push-button keys 26, keypad unit 25 has a toggle switch 28 located in a corner region of the array. In its mounted configuration, toggle switch 28 has a protective cover 29 and cap 32, and is mounted in a recess 36 in a (plastic) bezel 37. Shown at 38 is a protective rubber sheet that has a surface conformal with the array of keys of the keypad.

Because installation of the toggle switch in the keypad unit requires the use of a breakout connector 39 on the back of the keypad 25, the resulting thickness of the keypad unit 25 is somewhat increased by the location of toggle switch. To accommodate this slight protrusion at the rear of the keypad unit in the area of the toggle switch, module enclosure top 55 has a depression 56 co-located with the location of the toggle switch 28 on keypad unit 25, as shown in FIGS. 6, 13 and 14. As a result, when of keypad case segment 20 is brought into engagement with the first back 21 portion of the case segment 10, the keypad unit 25 will fit flush against module 50. Module enclosure top 55 also has an indent 58 at an edge portion 59, which is sized to accommodate ribbon cable 113 and thereby provide a compact ribbon cable feed path between printed circuit motherboard 53 and keypad unit 25.

As will be appreciated from the foregoing description, the unwanted introduction of contaminant material into interior of a telephone test set case is effectively remedied by modifying the housing configuration of the hand and face-conformal segment of the test set in accordance with the present invention to incorporate a resealable module that is sized to accommodate printed circuit components that are to be protected from contaminants in a compact nested arrangement. By virtue of its interior layout of the printed circuit modules and enclosure of the receiver, the invention is able to both protect the printed circuit boards and to provide a sufficient acoustic volume adjacent to the earpiece, so as to enhance the electrical-to-audio performance of the receiver transducer.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A test set assembly for housing an acoustic transducer and printed circuit components within a body of a craftsperson's test set, said test set assembly comprising a resealable module that is configured to be inserted into an acoustic transducer-containing portion of said body, said resealable module having an acoustic opening adjacent to an acoustic energy coupling portion of said body, and an acoustic transducer-receiving portion adjacent to said acoustic opening, said acoustic transducer-receiving portion being sized to accommodate an acoustic transducer, and a first seal element which is configured and is made of a material which snugly engages said acoustic transducer-receiving portion and said acoustic transducer-containing portion of said test set body, and provides a first seal against the introduction of dust and moisture contaminants into said module when said module is inserted into said acoustic transducer-containing portion of said test set body, a printed circuit board having a printed circuit arranged thereon, and being supported within said module relative to said acoustic transducer-receiving portion, so as to provide an acoustic chamber within said module adjacent to said acoustic opening thereof, said acoustic chamber providing for acoustic vibration adjacent to said acoustic transducer, a module enclosure top configured to be seated tightly against and close said module, and a second seal element, which is configured and is made of a material that is captured between said module enclosure top and said module and provides a second seal against the introduction of dust and moisture contaminants into said module.

2. A test set assembly according to claim 1, wherein said module further includes an opening through which a cable connected to said printed circuit board passes for connection to a circuit external to said module, and sealant material which is configured to seal said opening through which said cable passes and to provide a third seal against the introduction of dust and moisture contaminants into said module.

3. A test set assembly according to claim 2, wherein said sealant material comprises silicon gel coated on said cable and engaging said opening through which said cable passes.

4. A test set assembly according to claim 1, wherein said acoustic transducer element is a generally disc-shaped acoustic transducer and has a generally flat portion which is placed against that surface of said first seal element opposite to the surface thereof that abuts against a surface portion of said module adjacent to said acoustic opening.

5. A test set assembly according to claim 4, wherein said acoustic transducer-receiving portion of said module comprises an annular rim portion having an interior wall whose diameter is slightly greater than the diameter of said acoustic transducer, said first seal element being snugly captured on said annular rim portion, and wherein a plurality of bumps are distributed around the surface of said interior wall of annular rim portion of said module, said bumps being sized to provide a snug frictional capture of said acoustic transducer within said annular rim portion, while forming a series of thin annular gaps adjacent to said bumps between an exterior sidewall of said acoustic transducer and said interior wall of said annular rim portion of said module, said gaps being operative to equalize pressure on opposite sides of said acoustic transducer.

6. A test set assembly according to claim 5, wherein said module further includes a pair of diametrically opposed slots intersecting said acoustic opening, said slots being sized to allow for the passage therethrough of said generally disc-shaped acoustic transducer.

7. A test set assembly according to claim 1, wherein said printed circuit board comprises a motherboard having a plurality of printed circuit modules arranged in spaced apart, side-by-side relationship, on a side thereof facing said acoustic opening of said module, so as to provide one or more air gaps which serve as said acoustic chamber adjacent to said acoustic transducer.

8. A test set assembly according to claim 7, wherein said body has a transmitter cavity in which an acousto-electric transducer is mounted, a receiver cavity in which said resealable module is inserted, said acoustic transducer comprising an electro-acoustic receiver transducer, and wherein said test set further includes a keypad unit mounted to said body adjacent to said receiver cavity, and wherein said cable is connected to said keypad unit.

9. A test set assembly according to claim 8, wherein said keypad unit includes a switch element engaging a connector element on a back portion of said keypad unit, so that the resulting thickness of said keypad unit is increased at the location of said connector element, and wherein said module enclosure top has a depression co-located with the location of said connector element on said keypad unit, so that, when said keypad unit is engaged with said test body, said keypad unit fits flush with said module.

10. A test set assembly for housing an acoustic transducer and printed circuit components within a body of a craftsperson's test set comprising a resealable module that is configured to be inserted into an acoustic transducer-containing portion of said test set body, said resealable module including a shell portion configured to be insertable within and readily nest in proximity to the interior periphery of said acoustic transducer-containing portion of said test set body, said shell portion having an acoustic opening coupled with said acoustic transducer adjacent to an acoustic energy coupling portion of said test set body, and an acoustic transducer-receiving portion adjacent to said acoustic opening, said acoustic transducer-receiving portion being provided at a bottom portion of said shell portion and being sized to accommodate said acoustic transducer, and a first seal element which is configured and is made of a material which snugly engages said acoustic transducer-receiving portion and an interior surface of said acoustic transducer-containing portion of test set body, and provides a first seal against the introduction of dust and moisture contaminants into said module when said shell portion is inserted into said acoustic transducer-containing portion of said test set body, a printed circuit motherboard having a plurality of printed circuit modules arranged thereon, and being supported with respect to said shell portion, so as to provide an acoustic chamber within the interior of said shell portion adjacent to said acoustic opening of said shell portion, said acoustic chamber providing for acoustic vibration adjacent to said acoustic transducer, a module enclosure top configured to be seated tightly against said shell portion, and a second seal element, which is configured and is made of a material that is captured between said module enclosure top and said shell portion and provides a second seal against the introduction of dust and moisture contaminants into said module.

11. A test set assembly according to claim 10, wherein said shell portion further includes an opening through which a cable connected to said printed circuit motherboard passes for connection to circuit components external to said module, and sealant material which is configured to seal said opening through which said cable passes, and provide a third seal against the introduction of dust and moisture contaminants into said module.

12. A test set assembly according to claim 11, wherein said sealant material comprises silicon gel coated on said cable and engaging said opening through which said cable passes.

13. A test set assembly according to claim 10, wherein said acoustic transducer element is a generally disc-shaped acoustic transducer and has a generally flat portion which is placed against that surface of said first seal element opposite to the surface thereof that abuts against a surface portion of said shell portion adjacent to said acoustic opening.

14. A test set assembly according to claim 13, wherein said acoustic transducer-receiving portion of said shell portion comprises an annular rim portion having an interior wall whose diameter is slightly greater than the diameter of said acoustic transducer, said first seal element being snugly captured on said annular rim portion, and wherein a plurality of bumps are distributed around the surface of said interior wall of annular rim portion of said shell portion, said bumps being sized to provide a snug frictional capture of said acoustic transducer within said annular rim portion, while forming a series of thin annular gaps adjacent to said bumps between an exterior sidewall of said acoustic transducer and said interior wall of annular rim portion of said shell portion, said gaps being operative to equalize pressure on opposite sides of said acoustic transducer.

15. A test set assembly according to claim 14, wherein said shell portion has a pair of diametrically opposed slots intersecting said acoustic opening, said slots being sized to allow for the passage therethrough of said generally disc-shaped acoustic transducer.

16. A test set assembly according to claim 10, wherein said motherboard has a plurality of printed circuit modules arranged in spaced apart, side-by-side relationship, on a side of said motherboard facing said acoustic opening, so as to provide one or more air gaps which serve as said acoustic chamber adjacent to said acoustic transducer.

17. A test set assembly according to claim 11, wherein said test set body has a transmitter cavity in which an acousto-electric transducer is mounted, a receiver cavity in which said resealable module is inserted, said acoustic transducer comprising an electro-acoustic receiver transducer, and wherein said test set further includes a keypad unit mounted to said test set body adjacent to said receiver cavity, and wherein said cable is connected to said keypad unit.

18. A test set assembly according to claim 17, wherein said keypad unit includes a switch element engaging a connector element on a back portion of said keypad unit, so that the resulting thickness of said keypad unit is increased at the location of said connector element, and wherein said module enclosure top has a depression co-located with the location of said connector element on said keypad unit, so that, when said keypad unit is engaged with said test body, said keypad unit fits flush with said module.

19. A test set assembly for housing an acoustic transducer and printed circuit components within a body of a craftsperson's test set, said test set assembly comprising a resealable module that is configured to be inserted into an acoustic transducer-containing portion of said test set body, said resealable module including a shell portion configured to be insertable within and readily nest in proximity to the interior periphery of said transducer-containing portion of said test set body, said shell portion having an acoustic transducer-receiving portion configured to receive said acoustic transducer adjacent to an acoustic energy coupling portion of said test set body, and a first seal element which is configured and is made of a material which engages said acoustic transducer-receiving portion and an interior surface of said acoustic transducer-containing portion of said test set body, and provides a first seal against the introduction of dust and moisture contaminants into said module when said shell portion is inserted into said acoustic transducer-containing portion of said test set body, a printed circuit motherboard having a plurality of printed circuit modules arranged thereon, and being supported with respect to said shell portion, so as to provide an acoustic chamber within interior of said shell portion adjacent to said acoustic opening of said shell portion, which acoustic chamber provides for acoustic vibration adjacent to said acoustic transducer, a removable module enclosure top configured to close said shell portion, and wherein said shell portion further includes an opening through which a cable connected to said printed circuit motherboard passes for connection to circuit components external to said module, and sealant material which is configured to seal said opening through which said cable passes, and provide a second seal against the introduction of dust and moisture contaminants into said module.

20. A test set assembly according to claim 19, wherein said sealant material comprises silicon gel coated on said cable and engaging said opening through which said cable passes.

21. A test set assembly according to claim 19, wherein said acoustic transducer engages a third seal element opposite to a surface thereof that is arranged to engage a surface portion of said shell portion adjacent to said acoustic opening, and provide a third seal against the introduction of dust and moisture contaminants via said acoustic energy coupling portion of said test set body.

22. A test set assembly according to claim 21, wherein said shell portion includes an acoustic transducer-receiving annular rim portion having an interior wall whose diameter is slightly greater than the diameter of said acoustic transducer, and wherein a plurality of bumps are distributed around the surface of said interior wall of annular rim portion of said shell portion, said bumps being sized to provide a snug frictional capture of receiver element within said annular rim portion, while forming a series of thin annular gaps adjacent to said bumps between an exterior sidewall of said acoustic transducer and said interior wall of said annular rim portion of said shell portion, said gaps being operative to equalize pressure on opposite sides of said acoustic transducer.

23. A test set assembly according to claim 22, wherein said shell portion has a pair of diametrically opposed slots intersecting said acoustic opening, said slots being sized to allow for the passage therethrough of said generally disc-shaped acoustic transducer.

24. A test set assembly according to claim 19, wherein said motherboard has a plurality of printed circuit modules arranged in spaced apart, side-by-side relationship, on a side of said motherboard facing said acoustic opening, so as to provide one or more air gaps which serve as said acoustic chamber adjacent to said acoustic transducer.

25. A test set assembly according to claim 19, wherein said test set body has a transmitter cavity in which an acousto-electric transducer is mounted, a receiver cavity in which said resealable module is inserted, said acoustic transducer comprising an electro-acoustic receiver transducer, and wherein said test set further includes a keypad unit mounted to said test set body adjacent to said receiver cavity, and wherein said cable is connected to said keypad unit.

26. A test set assembly according to claim 25, wherein said keypad unit includes a switch element engaging a connector element on a back portion of said keypad unit, so that the resulting thickness of said keypad unit is increased at the location said connector element, and wherein said module enclosure top has a depression co-located with the location of said connector element on said keypad unit, so that, when said keypad unit is engaged with said test body said keypad unit fits flush with said module.

* * * * *